(12) United States Patent
Rinderer

(10) Patent No.: US 6,415,560 B1
(45) Date of Patent: Jul. 9, 2002

(54) SEISMIC BRACING CONNECTOR

(75) Inventor: Eric R. Rinderer, Highland, IL (US)

(73) Assignee: Cooper Technologies Company, Houston, TX (US)

(*) Notice: Subject to any disclaimer, the term of this patent is extended or adjusted under 35 U.S.C. 154(b) by 0 days.

(21) Appl. No.: 09/847,773

(22) Filed: May 2, 2001

(51) Int. Cl.[7] .............................. E04B 1/93; E04B 1/38; E04H 9/02
(52) U.S. Cl. ..................... 52/167.1; 52/167.4; 52/713; 52/714; 248/59; 248/351; 248/638; 403/71; 403/119; 403/220; 403/260
(58) Field of Search .......................... 52/167.1, 167.4, 52/712–714; 248/59, 351, 354.1, 638; 403/71, 119, 209, 220, 243, 260, 262

(56) References Cited

U.S. PATENT DOCUMENTS

| | | |
|---|---|---|
| 656,686 A | 8/1900 | Wolf |
| 1,132,999 A | 3/1915 | Beers |
| RE14,554 E | 11/1918 | Grubbs |
| 1,466,292 A | 8/1923 | Bell |
| 1,702,124 A | 2/1929 | Matthes |
| 1,835,078 A | 12/1931 | Ornberg |
| 2,146,539 A | 2/1939 | Hahn et al. |
| 2,231,462 A | 2/1941 | Cobb |
| 2,535,427 A | 12/1950 | Kindorf |
| 3,240,870 A | 3/1966 | Harmon |
| 3,377,038 A | 4/1968 | Loudon |
| 3,570,794 A | 3/1971 | Kirschner |
| 3,866,871 A | 2/1975 | Dupuy, Sr. |
| 3,918,322 A | 11/1975 | Frier et al. |
| 4,053,706 A | 10/1977 | Houston et al. |
| D246,346 S | 11/1977 | Strunk |
| 4,063,700 A | 12/1977 | Brewer |
| 4,065,218 A | 12/1977 | Biggane |
| 4,078,752 A | 3/1978 | Kindorf |
| 4,524,936 A | 6/1985 | Hurtubise |
| D285,647 S | 9/1986 | Sachs |
| 4,634,327 A | 1/1987 | Kowalski |
| 4,637,175 A | 1/1987 | Froening et al. |

(List continued on next page.)

FOREIGN PATENT DOCUMENTS

WO WO 00/19028 4/2000

OTHER PUBLICATIONS

John A. Shelton, *Approved Components: Hinged Seismic Connectors with Retaining Clip*, National Uniform Seismic Installation Guidelines, Sep. 1992, 1 page (p. 88).
Mason Industries, Inc., *Transverse Seismic Cable Brace Hook Guidelines for Trapeze Supported Electrical Cable Trays*, Mar. 1999, 1 page (p. F29).
Mason Industries, Inc., *SCBH–Seismic Cable Brace with Hook Attachment*, Mar. 1999, 1 page (p. X2).
Negurosu B5–301, *brochure*, by Negurosu Denko K.K., Undated, 1 page (p. 101), admitted to prior art.

Primary Examiner—Carl D. Friedman
Assistant Examiner—Yvonne M. Horton
(74) Attorney, Agent, or Firm—Senniger, Powers, Leavitt & Roedel

(57) ABSTRACT

A connector for connecting a seismic brace to a support rod, such as for a cable tray, to inhibit movement of the rod during seismic activity. The connector comprises a metal connecting member having an upper portion and a lower portion joined at a juncture. Openings in the juncture, upper portion and lower portion define a slot for entry of the support rod into the slot. The connector further comprises a retainer inserted in a gap between the upper and lower portions. The retainer bridges the slot to retain the support rod in the slot. The connector permits bracing to be added without removal of the support rod from the tray and ensures that the brace remains attached during seismic activity, even where a retaining nut holding the connector to the support has become loosened.

13 Claims, 11 Drawing Sheets

U.S. PATENT DOCUMENTS

| | | |
|---|---|---|
| 4,673,151 A | 6/1987 | Pelz |
| 4,697,770 A | 10/1987 | Kirschner |
| 4,714,219 A | 12/1987 | Mayse |
| 4,744,192 A * | 5/1988 | Commins .................... 52/714 |
| 5,004,193 A | 4/1991 | Kirschner |
| 5,007,603 A | 4/1991 | Kirschner |
| 5,024,580 A | 6/1991 | Olive |
| 5,082,216 A | 1/1992 | Roth |
| 5,092,097 A * | 3/1992 | Young .......................... 52/702 |
| 5,145,132 A | 9/1992 | Kirschner |
| 5,188,317 A | 2/1993 | Roth |
| 5,295,646 A | 3/1994 | Roth |
| 5,307,752 A | 5/1994 | Perrault et al. |
| 5,323,988 A | 6/1994 | Handler |
| 5,412,843 A | 5/1995 | Krongauz et al. |
| 5,832,679 A | 11/1998 | Roth |
| 6,247,274 B1 | 6/2001 | Thompson et al. |

\* cited by examiner

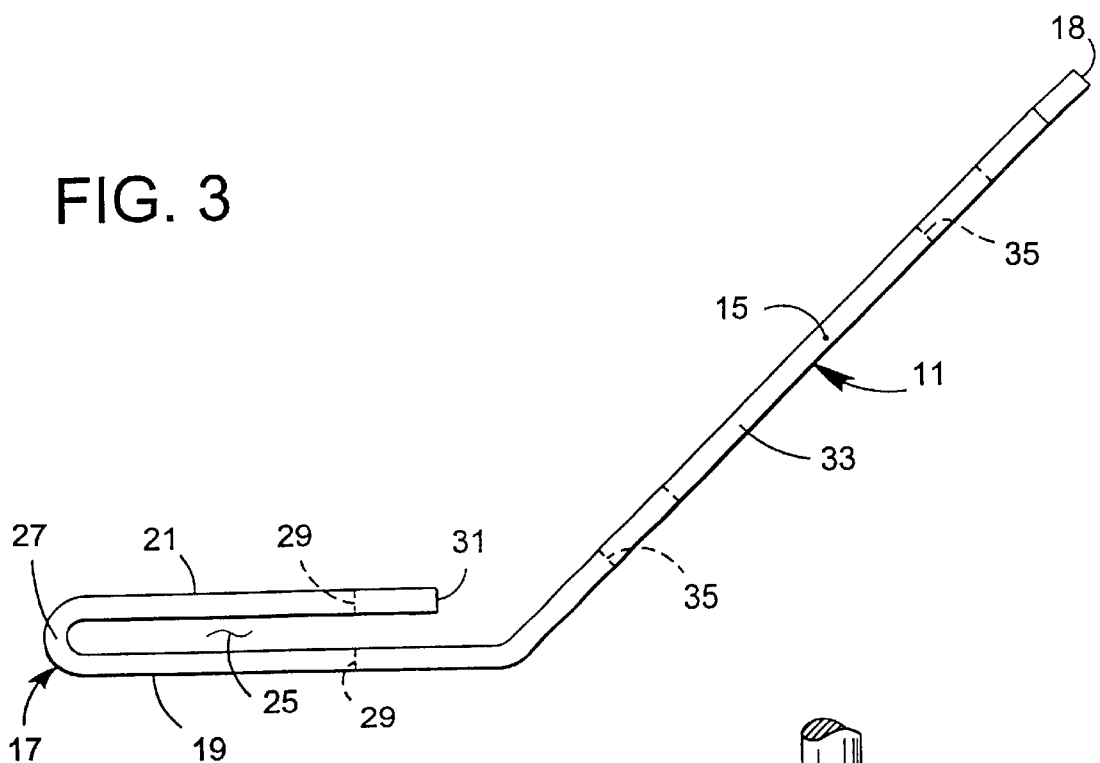
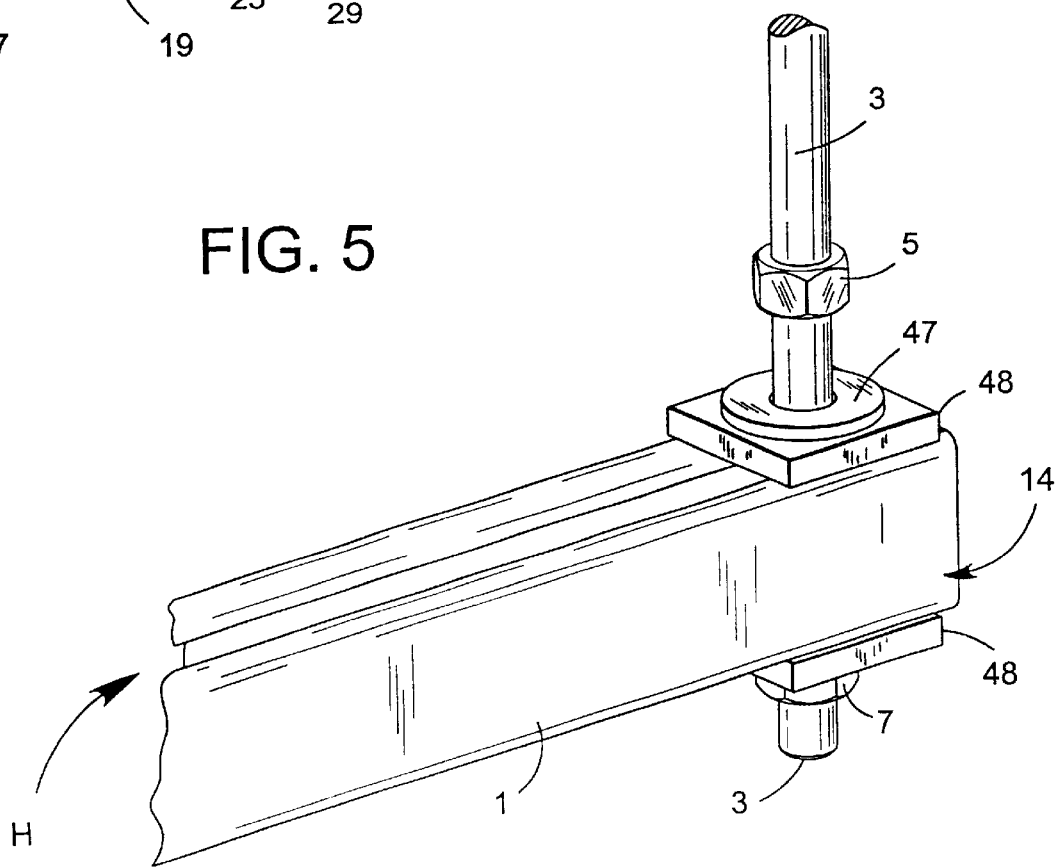

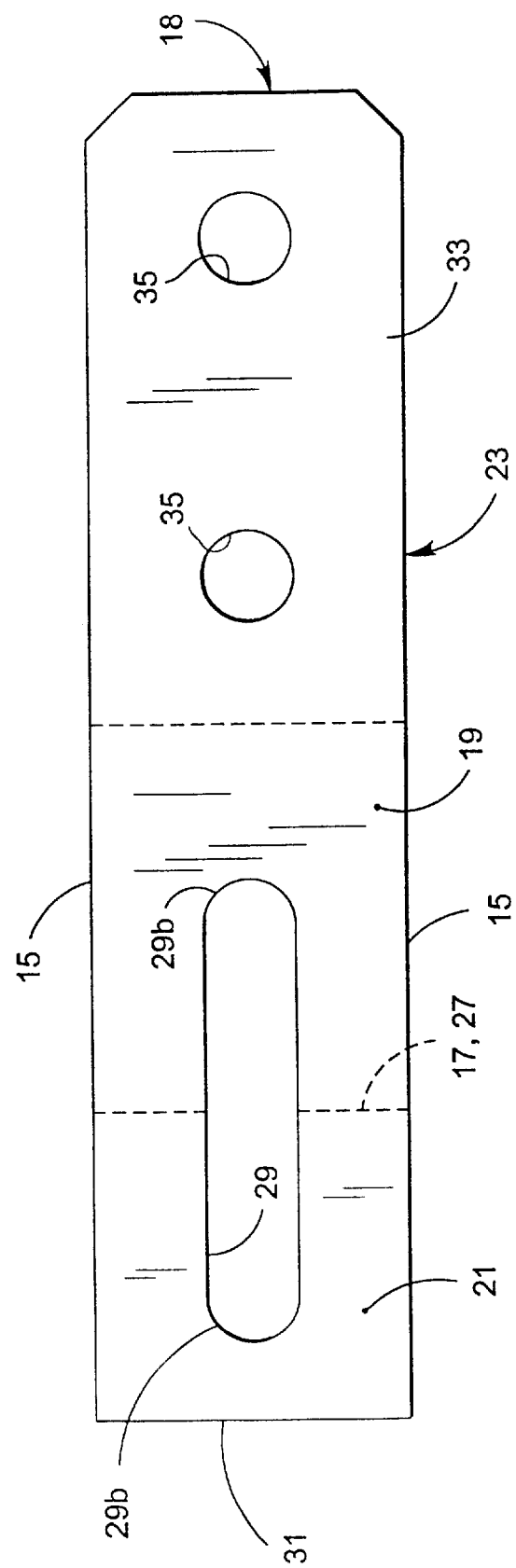

SEISMIC BRACING CONNECTOR

BACKGROUND OF THE INVENTION

This invention relates to seismic bracing connectors, and more particularly to a connector for use especially for connection of a seismic brace to a hanger for holding a tray for cable or electrical wire, or for holding pipe, conduit, etc. The connector is especially adapted for retrofitting existing systems of such trays or platforms with seismic bracing to inhibit undue lateral movement (sway) of the hanger in the event of seismic activity. The connector may be useful not only for such retrofit but also for original installation. It is contemplated that the connector may even have bracing connection uses other than for hangers.

Conventionally, hangers such as described for systems comprising trays holding communication cable, electrical wiring or the like or for pipe or conduit, etc. in office buildings, manufacturing plants and other facilities typically include support rods extending downward vertically from a ceiling or truss system to provide support for trays or other items in horizontal position. As such, they do not per se provide sufficient lateral support for resisting large forces, such as those induced by an earthquake. Additional seismic bracing attached to the hangers provides the added lateral support required to withstand seismic activity.

These seismic braces typically have two ends, one attachable to a support such as a ceiling or truss system and the other attachable to the hanger. Where an existing hanger is to be fitted with seismic braces, the braces are preferably connected while the support rods remain fully supportive of the hanger during installation. Moreover, it is desirable that these braces incorporate features to ensure they remain connected during seismic activity, even where a fastener securing the brace to the hanger has loosened.

Previous systems for attaching seismic bracing suffered from various drawbacks. For example, U.S. Pat. No. 5,188,317 (Roth) discloses a seismic connector 24 with a retaining clip 30. Several angle tabs 57a, 57b, 57c punched from the clip engage several slots 28, 61a, 61b in the seismic connector to keep the clip in place. During seismic activity, these tabs are prone to fail, allowing the clip to move from its proper position. Without the clip, the seismic connector no longer provides any lateral support to resist the seismic movements. Other designs incorporating tabs or other small retaining members suffer from similar drawbacks. Another disadvantage of other designs includes the use of threaded cable as a bracing member. Because cable only provides support in tension, and not compression, two opposing braces are required to support a tray. Using two supports is not always desirable because it requires twice the number of supports, as compared to a rigid support, which provides both compressive and tensive support.

SUMMARY OF THE INVENTION

Among the several objects and features of the present invention may be noted the provision of a connector for a seismic brace that permits bracing to be added without removing a vertical support rod from a trapeze-type hanger for a tray or other item; the provision of such a connector that permits bracing to be added without removing a lower retaining nut from the vertical support rod; the provision of such a connector that remains attached to a support rod during seismic activity; the provision of such a connector that will provide adequate support even where a fastener holding the connector to the support has become loosened; the provision of such a connector that reduces the number of failure modes of the connector, making the connector more reliable; and the provision of a connector that evenly distributes seismic activity forces through the connector.

Generally, a connector of the present invention for connecting a seismic brace to a support rod to inhibit movement of the rod during seismic activity comprises a metal connecting member. The member has opposite sides and opposite ends, a lower portion and an upper portion overlying at least part of the lower portion and spaced therefrom to form a gap between the upper and lower portions. The upper and lower portions are joined at a juncture at one end of the member. Openings in the juncture and in the upper and lower portions of the connecting member define a slot extending from the juncture toward an opposite end of the connecting member. The slot has an open end at the juncture for entry of the support rod into the slot and a closed opposite end. The connector further comprises a retainer for insertion in the gap between the upper and lower portions of the connecting member to a rod-retaining position in which it bridges the slot, and in which it is disposed between the juncture and the support rod when the rod is in the slot, whereby the support rod is retained in the slot by the retainer. The retainer is adapted to engage the juncture on opposite sides of the slot during seismic activity to prevent the rod from moving out of the slot.

In another embodiment of the present invention, a connector is set forth generally as above, wherein the connecting member further comprises a one-piece member of sheet metal bent to form the upper and lower portions. The retainer further comprises a metal member having a slot extending into the member from one edge thereof. The retainer slot has an open end for entry of the support rod into the slot and a closed end. The retainer slot extends generally at right angles to the slot in the connecting member when the retainer is in its rod-retaining position.

In yet another embodiment, a seismic brace system comprises a seismic brace in combination with a metal connecting member and retainer as set forth in the first embodiment. The seismic brace further comprises two ends, one attachable to a support such as a ceiling or truss system and the other attachable to the metal connecting member for bracing a support rod.

Other objects and features of the present invention will be in part apparent and in part poi nut hereinafter.

BRIEF DESCRIPTION OF THE DRAWINGS

FIG. 3 is an elevation of a metal connecting member per se of the connector of FIG. 2;

FIG. 4 is a plan view of the metal connecting member of FIG. 3 in its original condition;

FIG. 5 is a perspective showing the support rod of FIG. 1 with an upper retaining nut loosened;

Corresponding parts are designated by corresponding reference numbers throughout the drawings.

DETAILED DESCRIPTION OF THE PREFERRED EMBODIMENTS

Figure 1:
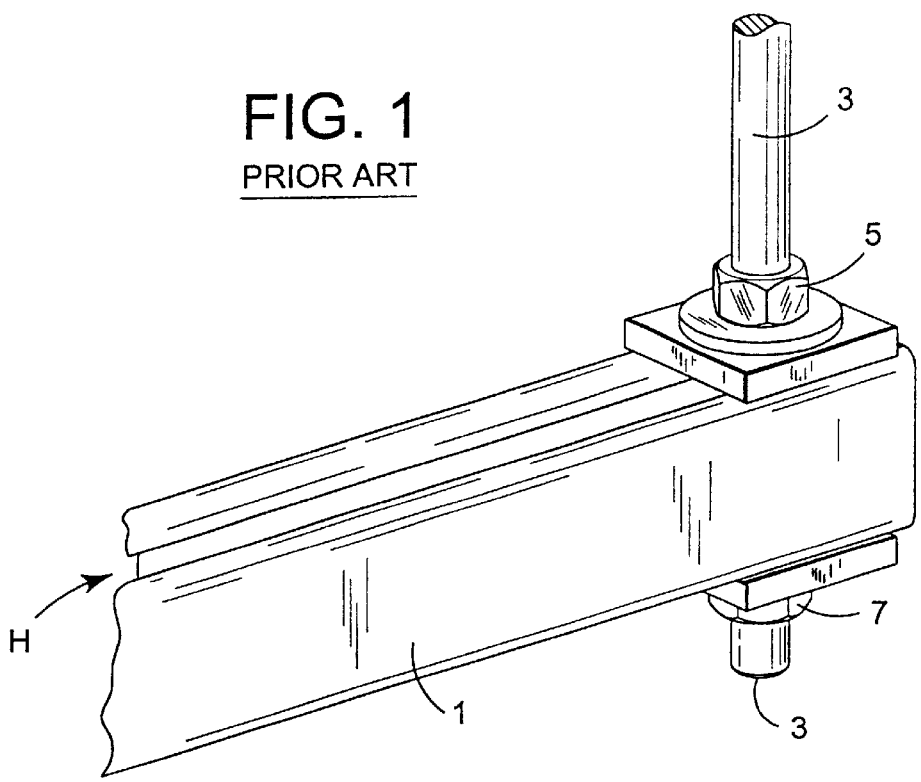
FIG. 1 is a perspective of a prior art support rod and trapeze-type cross-bar which supports a tray, for example, the tray being omitted.
Figure 11:
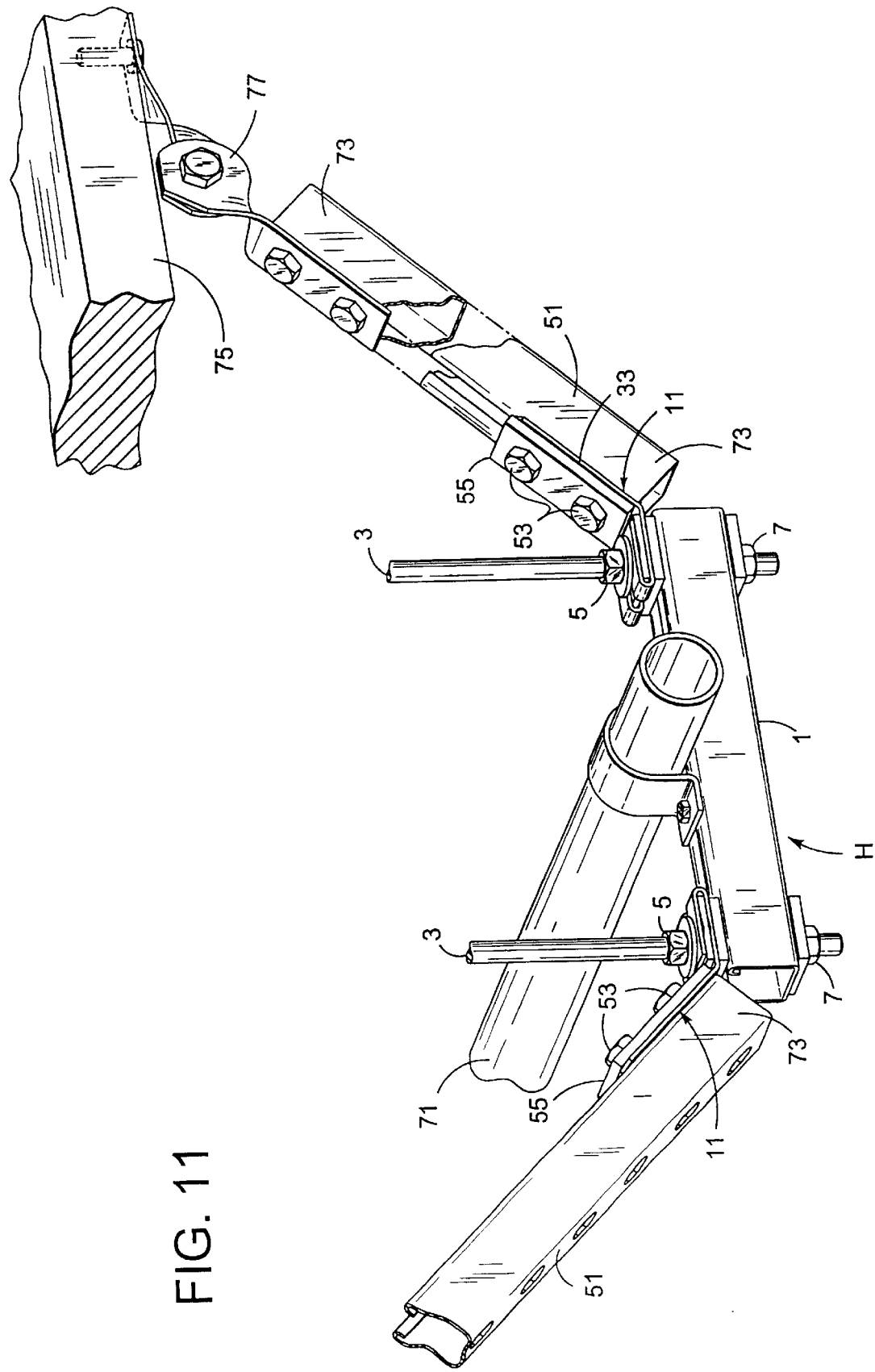
FIG. 11 is a perspective of a pipe hanger with opposing seismic braces.

Referring first to FIG. 1, there is illustrated a conventional hanger generally designated H comprising a trapeze-type cross-bar 1 for supporting a tray (not shown) of the type widely used in industry. Multiple support rods, such as the rod 3, extending downward (e.g., from a ceiling) suspend the cross-bar 1 in horizontal position. An upper retaining nut 5 and a lower retaining nut 7 are threaded onto the support rod 3 above and below the cross-bar 1, respectively, sandwiching the cross-bar in self-retaining relation to the support rod. Preferably, two support rods 3 extend downward and are attachable to opposite ends of a single cross-bar 1, forming a generally U-shaped hanger or support (FIG. 11). The hangers comprising the support rods 3 and cross-bars 1 provide adequate support for the tray and hold the tray with cable therein, for example, in a self-retaining position. During seismic activity, such as an earthquake, however, movement of the building to which the tray is attached may induce swaying of the tray laterally, without bracing to limit its movement. Seismic braces attachable to trays to help limit their movement are well known in the art. The present invention is directed to a connector for installing such seismic braces in existing structures without the need to first remove the supports for the trays, and also to a connector which functions in a novel way to support trays so the braces remain attached, even where a fastener holding the brace is loose.

Figure 2:
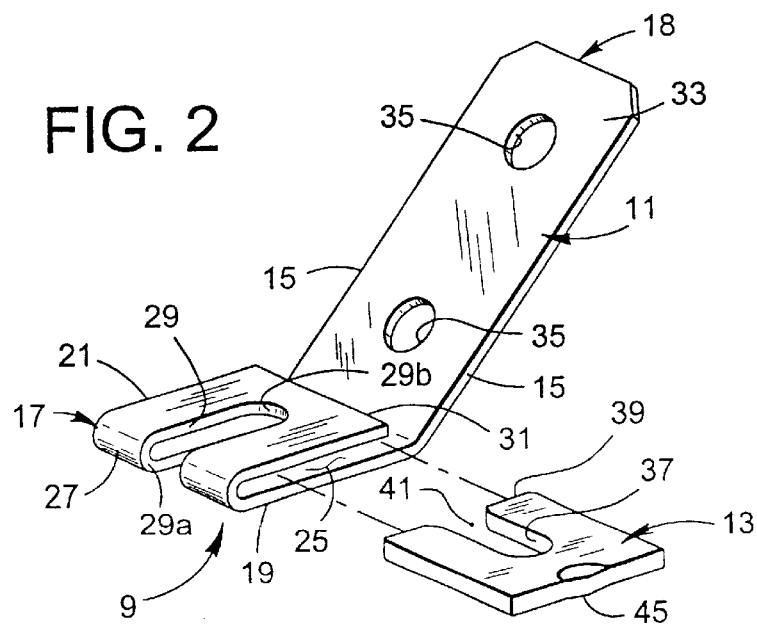
FIG. 2 is an exploded perspective of a connector of the present invention.

Referring now to FIGS. 2–4, a connector of the present invention, generally designated 9 in its entirety, comprises a metal connecting member 11 and a retainer 13 for connection of a seismic brace to a hanger to inhibit movement of the hanger during seismic activity. The metal connecting member 11 has opposite sides 15, opposite ends 17 and 18, a lower portion 19 and an upper portion 21. The connecting member 11 is preferably a one-piece member of sheet metal bent to form the upper and lower portions 21, 19. More specifically, the member 11 is preferably formed of steel, for example 12 gage ASTM 570 or another appropriate gage and grade of steel. FIGS. 2 and 3 depict the connecting member 11 in its preferred configuration, comprising a strip bent into a generally J-shape. Before being formed in a J-shape, as further described below and shown in FIG. 4, the connecting member is formed as a flat blank 23 in unbent shape. The connecting member 11 may be formed in a variety of different shapes without departing from the scope of the present invention. In addition, the connecting member 11 may be formed from multiple pieces fastened together, rather than from a single metal strip bent as depicted in the Figures.

Once the blank is fully bent into the J-shaped configuration of FIGS. 2 and 3, the upper portion 21 overlies at least part of the lower portion 19 and is spaced therefrom to form a gap 25 between the upper and lower portions. The upper and lower portions 21, 19 join at a juncture 27 (a bend) at one end 17 of the connecting member. The juncture comprises the bend line 27, where the upper member is folded over to lie parallel to the lower member. Openings in the juncture 27, the upper portion 21 and the lower portion 19 cooperate to define a slot 29 extending from the juncture (end 17) toward the opposite end 18 of the connecting member 11. The slot 29 has an open end 29a at the juncture 27 for reception of the support rod 3, and a closed opposite end 29b for limiting movement of the connecting member 11 as it is applied to the. support rod 3. Both the upper portion 21 and the lower portion 19 include the closed opposite end 29b. The upper portion 21 of the connecting member terminates at 31 in an edge opposite the juncture 27 (the bend), and the slot 29 in the connecting member terminates short of the edge.

The lower portion 19 of the connecting member 11 additionally has extension 33 projecting upwardly at an angle from the horizontal portion 19 of the connecting member. The extension 33 is formed by bending part of the blank 23 upward from the plane of the lower portion 19 along the bend line at 27. The extension 33 has a plurality of holes 35, preferably two, for attaching the connector 9 to the seismic brace as discussed in greater detail below. It should be understood that the extension 33 may extend from the plane of the lower portion 19 at an angle different from the angle shown in the Figures and that the retainer may include more or less holes 35 without departing from the scope of the present invention.

The retainer 13 is adapted for insertion crosswise in the gap 25 between the upper and lower portions 21, 19 of the connecting member 11 to a rod-retaining position. The retainer 13 bridging the slot extends crosswise of the slot 29 between the juncture 27 and the edge 31 with the rod 3 in the slot, thus retaining the support rod in the slot. The retainer 13 is adapted to engage the juncture 27 (the bend) on opposite sides of the slot 29, thereby preventing the rod 3 from exiting the slot during seismic activity. In one embodiment, the retainer 13 comprises a generally square flat metal member having a slot 37 extending into the member from one edge 39. The slot 37 has an open end 41 for entry of the support rod 3 into the slot and a closed end 43 engageable with the rod for limiting movement. The retainer slot 37 extends generally at a right angle to the slot 29 in the connecting member 11 when the retainer 13 is in its rod-retaining position within the gap 25 wherein it inhibits the support rod 3 from moving with respect to the connecting member 11. During an earthquake, the rod 3 exerts forces upon the retainer 13, but the retainer is inhibited from movement out of the connecting member 11 because the rod engages the retainer slot 37 at an angle perpendicular to the direction of insertion of the retainer, thus holding the retainer from moving out of the gap 25.

The retainer 13 further includes a small protuberance 45 which creates an interference (frictional) fit between the retainer and the upper and lower portions 21, 19 of the connecting member 11 when the retainer is inserted into the gap 25. This fit helps ensure that the retainer 13 remains in place, even if the upper retaining nut becomes loose. Other methods of retaining the retainer 13 within the gap 25 are also contemplated as being within the scope of this invention (e.g., additional protuberances; knurling, or tacky or elastic materials on the retainer surface; protrusions within the retainer slot for engaging the support rod). In addition, the retainer may be shaped differently to encourage retention of the retainer within the connector. For example, alternate embodiments of such retainers are discussed in greater detail below and shown in FIGS. 12 and 13.

In use, it is preferable to install a seismic brace while the support rod 3 continues to support the horizontal cross-bar 1, eliminating the need for temporary bracing of the hanger H during brace installation. The present invention allows for such an installation, as depicted in FIGS. 5–9. The upper retaining nut 5 is first loosened from engagement with a washer 47, allowing adequate space for inserting the connector 11. The lower retaining nut 7 remains threaded onto the support rod engaging washer (not shown) at the bottom of the cross-bar 1 and supports the hanger H and thereby the tray and its contents during brace installation. Metal squares such as indicated at 48 are shown as applied to the rods 3 engaging top and bottom of the cross-bar 1.

Figure 6:
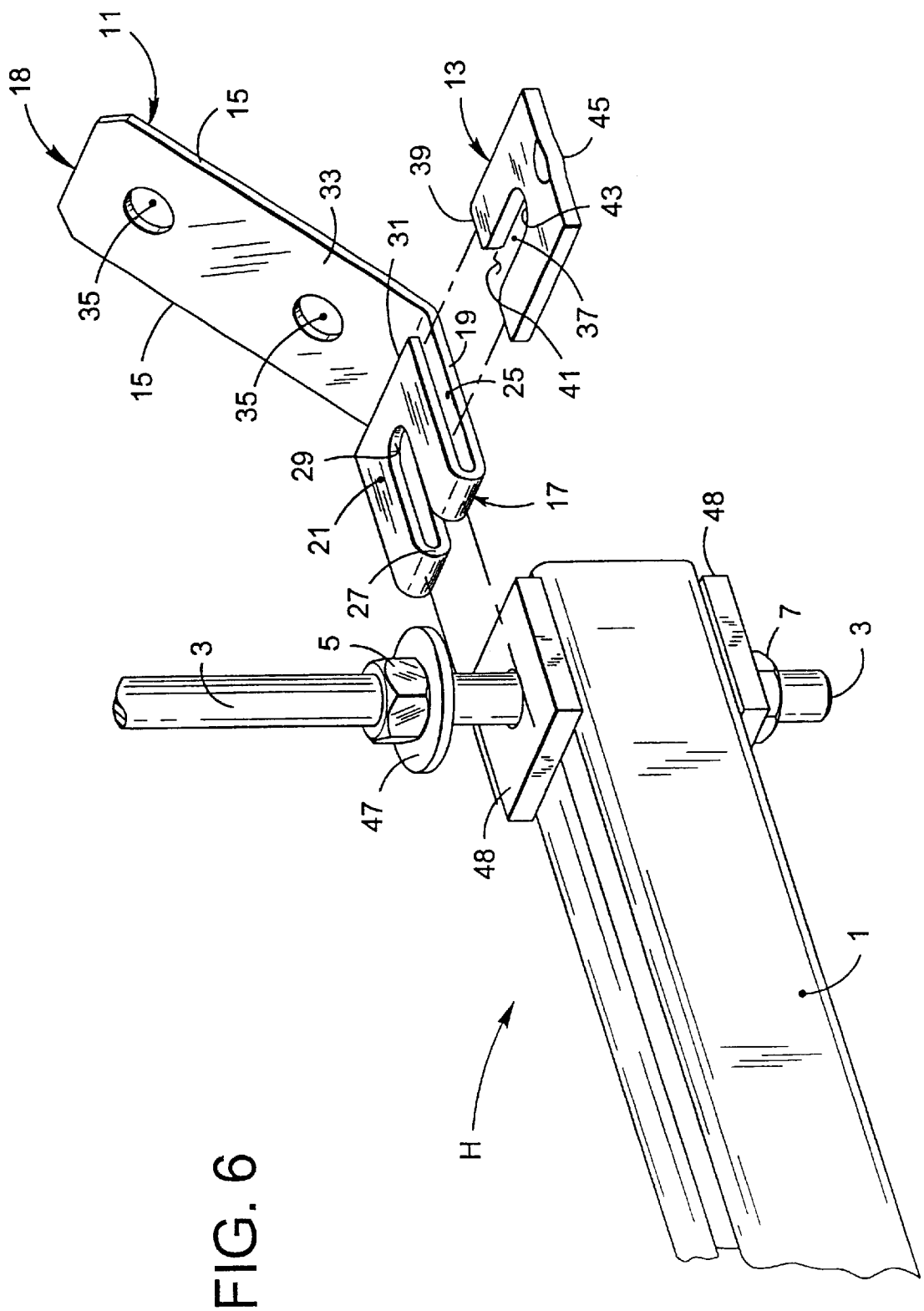
FIG. 6 is a perspective of the connector of FIG. 2 ready for engagement with the support rod of FIG. 5.
Figure 7:
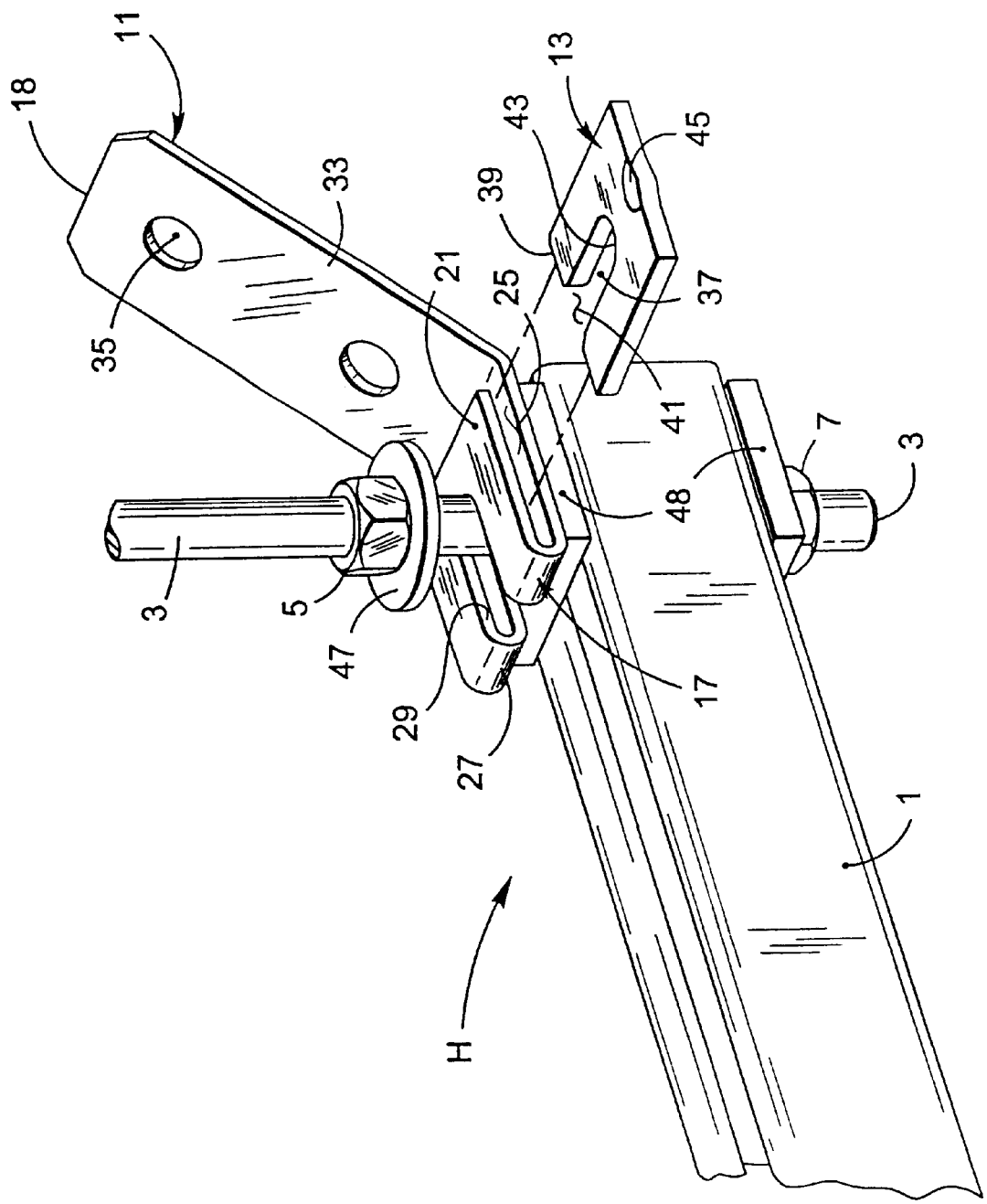
FIG. 7 is a perspective of the metal connecting member engaging the support rod showing a retainer of the connector in position for assembly with the member.

Referring now to FIGS. 6 and 7, the washer 47 may then be lifted upward toward the upper retaining nut 5, allowing application of the metal connecting member 11 to the support rod 3, via the slot 29. The metal connecting member 11 is pushed onto the support rod 3 until the closed end 29b of the slot engages the rod, thereby limiting the inward movement of the metal connecting member. In this position, as shown in FIG. 7, the connecting member 11, when attached to the hanger H and a seismic brace, effectively limits movement of the rod 3 in each direction, except along the axis of slot 29.

Figure 8:
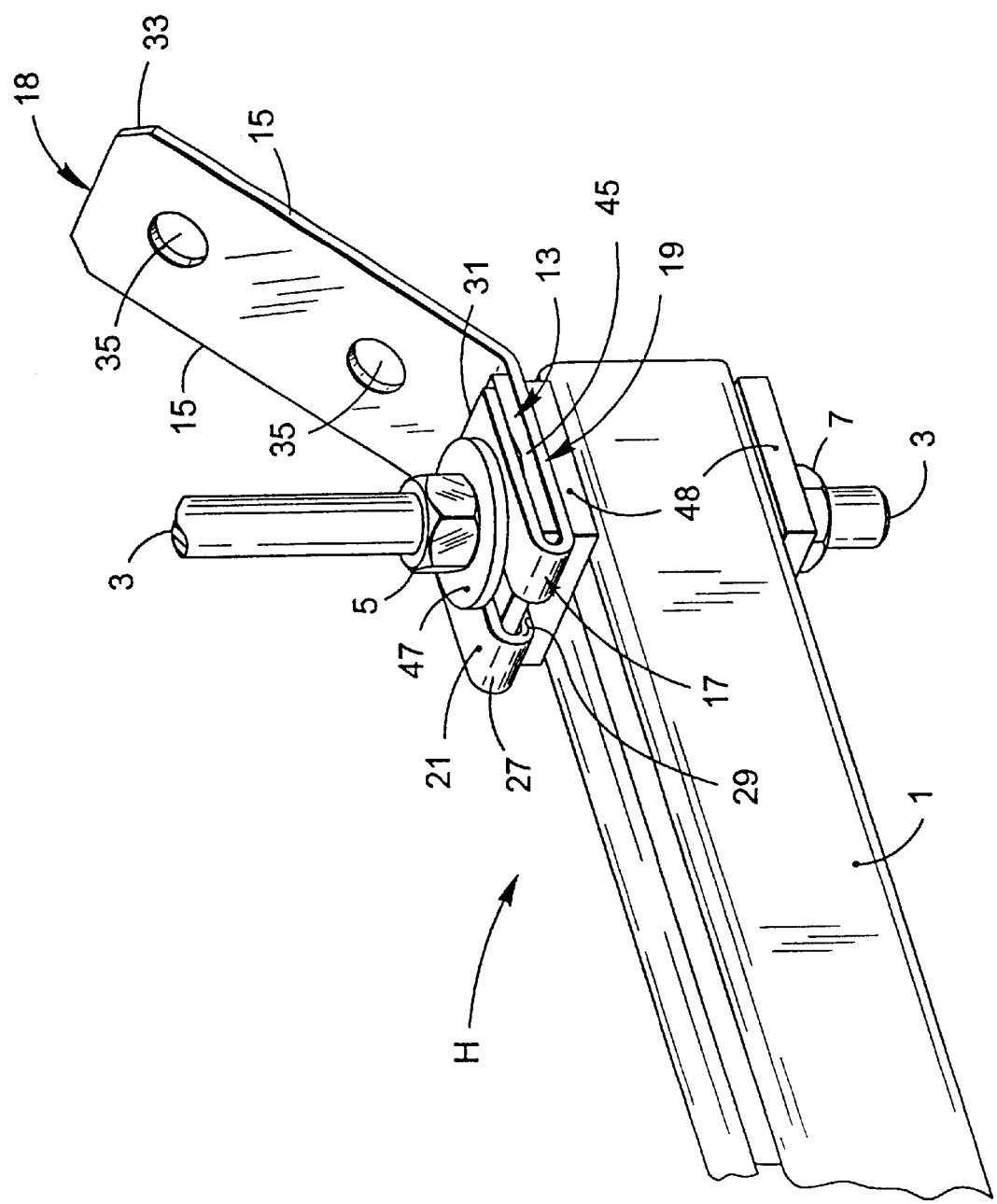
FIG. 8 is a perspective of the retainer engaging the metal connecting member and rod, with the upper retaining nut tightened.

Referring now to FIG. 8, the addition of the retainer 13 limits movement of the support rod 3 along the axis of the slot 29 of the connecting member 11, thereby removing the final degree of freedom of the support rod. Because of the small protuberance 45, the retainer 13 fits snugly in the gap 25 between the upper and lower portions 21, 19 of the connector 11. The retainer 13 bridges the slot 29, restricting movement of the support rod 3 along the slot 29. Moreover, because the retainer 13 engages the juncture 27 on opposite sides of the slot 29, both sides of the connecting member 11 bear an equal burden of the load. Finally, the upper retaining nut 5 is tightened down onto the washer 47 to compress the washer 47, the upper portion 21, the retainer 13 and the lower portion 19. The compressive forces created between the upper retaining nut 5 and the lower retaining nut 7 further help hold the retainer 13 within the connecting member 11.

Figure 9:
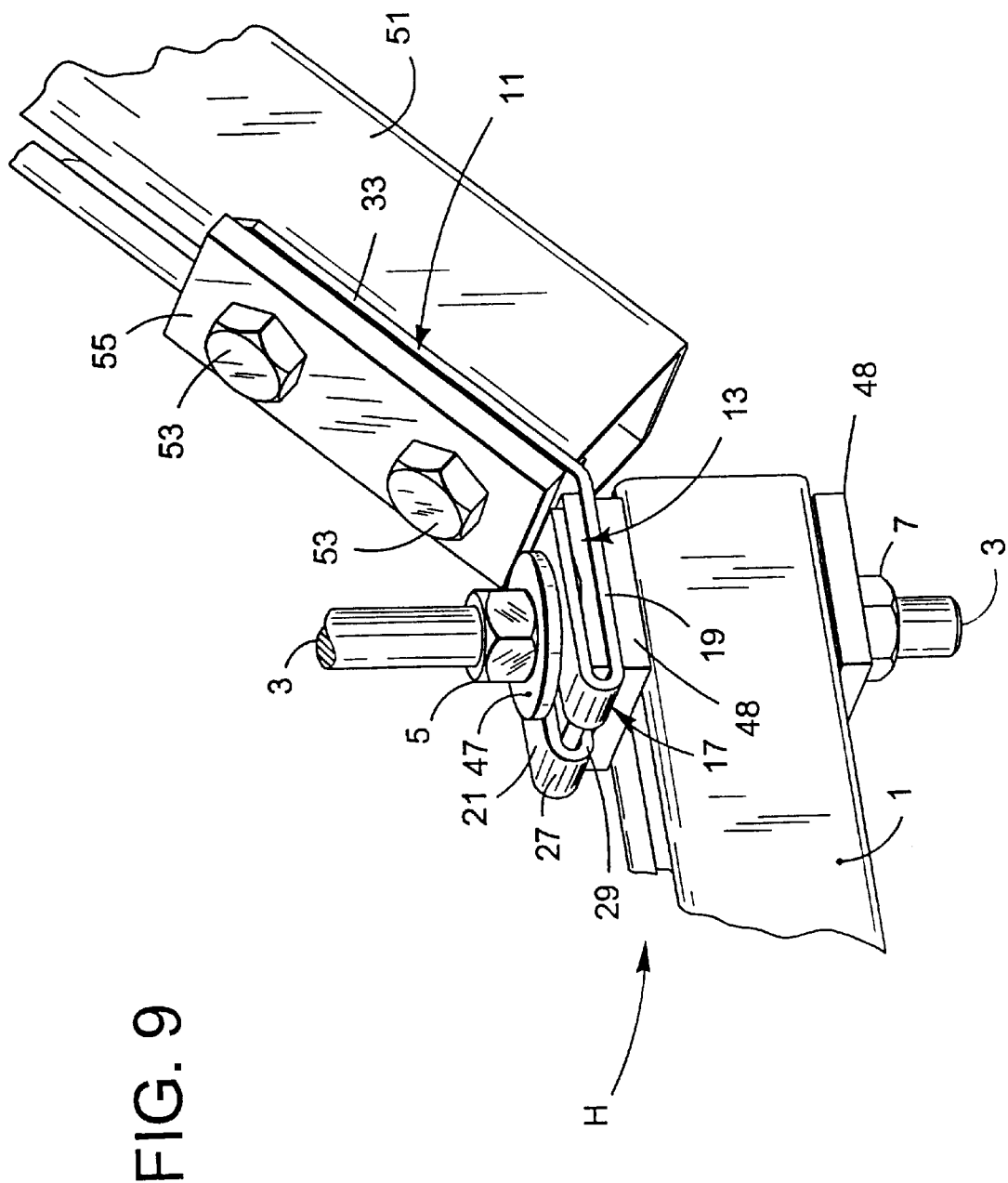
FIG. 9 is a perspective of the present invention with a strut-type seismic brace attached.

Referring now to FIG. 9, seismic brace 51 is attached to connector 11 via bolts 53 inserted into the holes 35 of the extension 33. The seismic brace 51 is constituted by a rigid strut and is attached to the extension 33 of the connector 11 on the underside thereof by bolts 53, extension 33 being fastened between a clamping plate 55 and the strut 51, the latter having its upper end suitably secured to ceiling structure. Thus, the load is spread throughout the width of the extension 33. The plate 55 reduces the possibility of the extension 33 being ruptured by the forces exerted on the connector 11 due to seismic activity. Moreover, because the upper portion 21 and lower portion 19 are in parallel relation with one another, the connector is much less susceptible to failure due to bending, as with some prior art designs. Should the connecting member 11 bend upward, as due to fatigue, the connector will remain attached to the hanger H, performing its stabilizing function. It should be understood that the extension 33 may attach to the seismic brace 51 by other than bolts without departing from the scope of the present invention.

Figure 10:
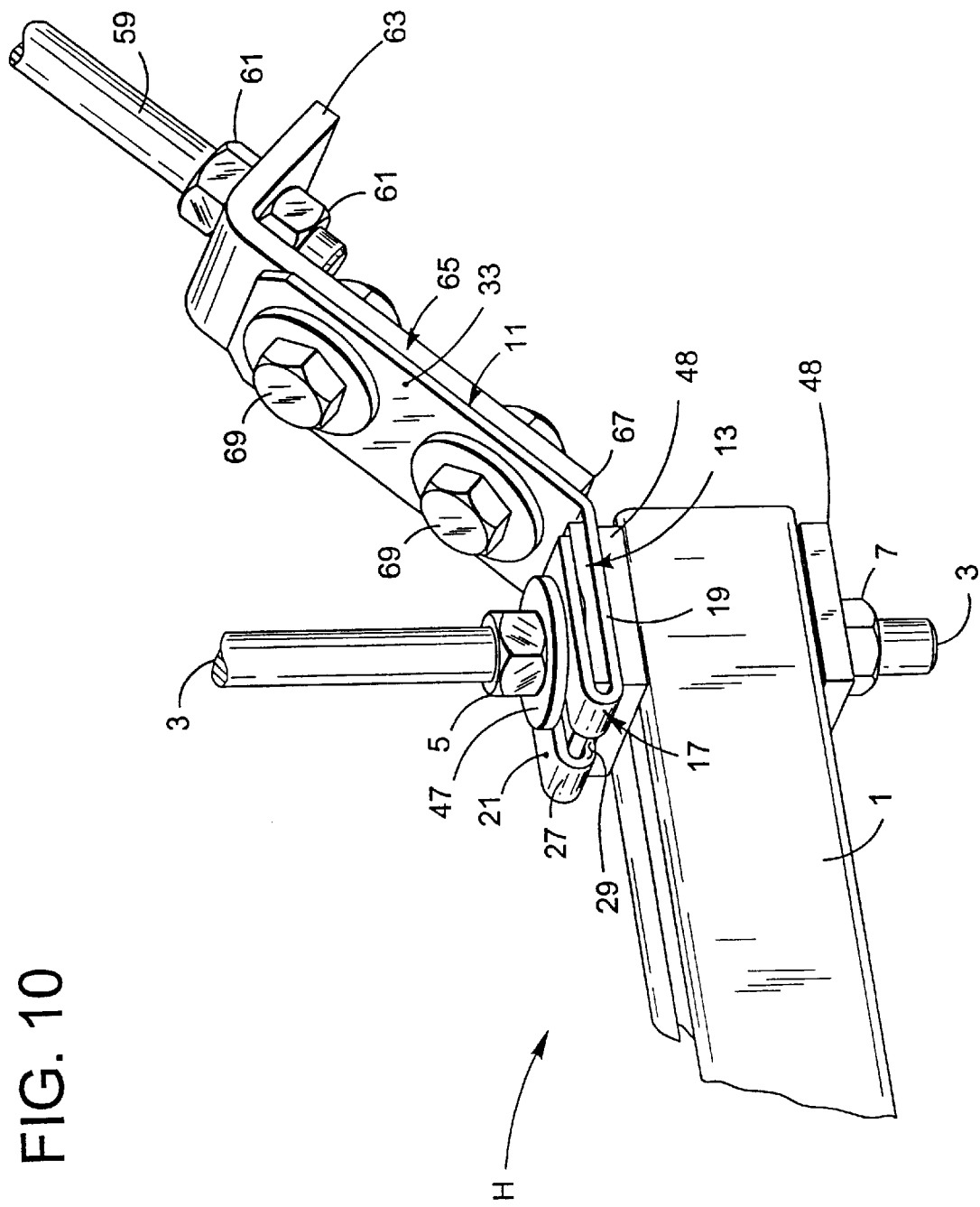
FIG. 10 is a perspective of the present invention with a rod-type seismic brace attached.

Referring now to FIG. 10, a seismic brace other than the brace 51 such as a rigid rod 59 is also contemplated as being within the scope of this invention. Rod-type seismic braces may be fastened as indicated at 61 to one leg 63 of an L-shaped end piece 65, the other leg 67 thereof being fastened by bolts 69 to connector extension 33. Seismic braces of other cross sectional shapes are also contemplated as being within the scope of this invention (box beams, square rod, angle irons, etc.).

Referring now to FIG. 11, an assembly carrying a pipe 71 with seismic braces 51 on opposite sides of the cross-bar 1 is shown. Each seismic brace 51 has two ends 73, one attachable to a support 75 such as a ceiling or truss system via a pivotable connector 77, and the other attachable to the metal connecting member 11 for bracing the support rod 3. A single seismic brace may also be used where appropriate. For example, a single rigid seismic brace could be used since it provides both tensile and compressive support to resist lateral movement of the cross-bar 1 in both directions.

Figure 12:
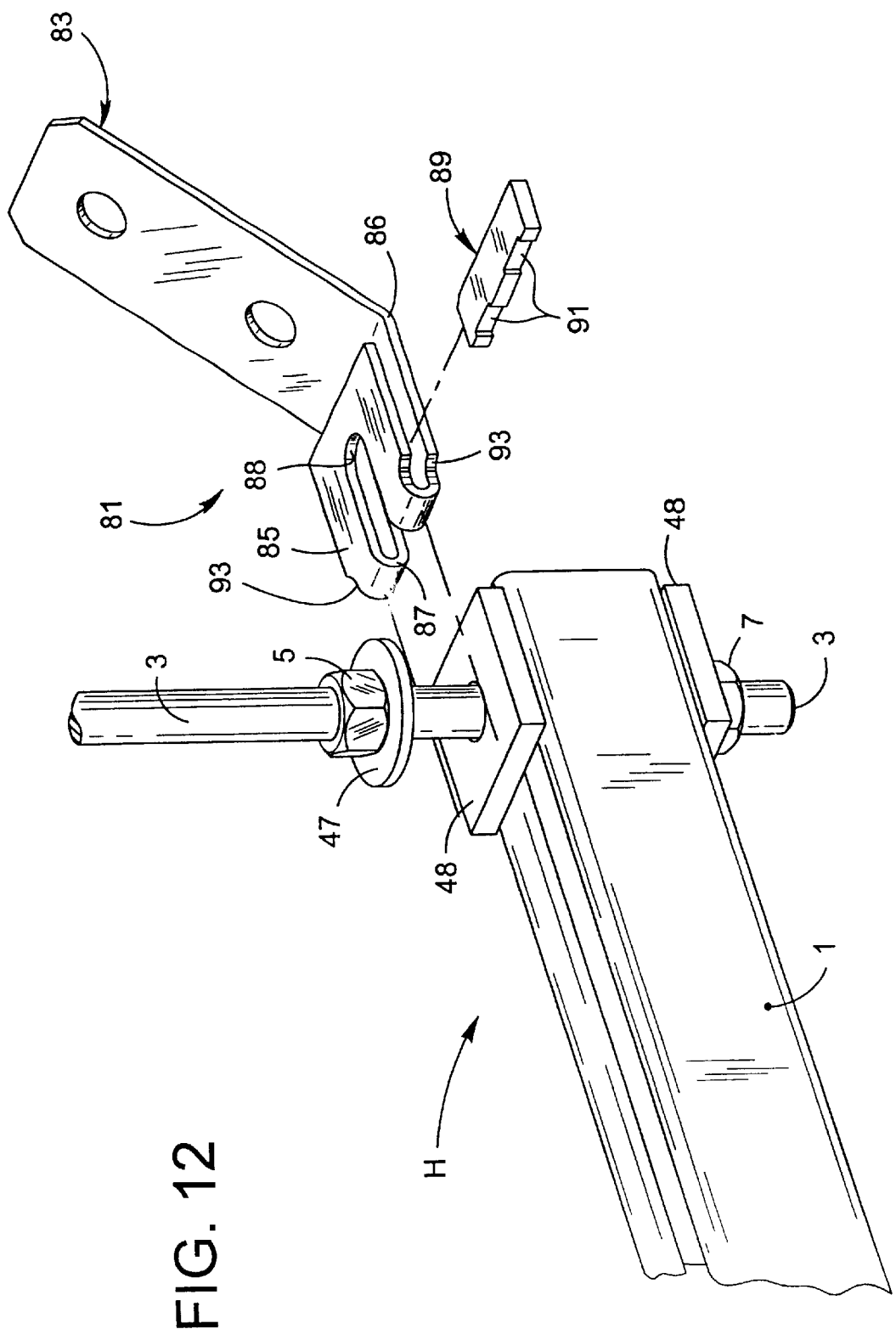
FIG. 12 is a perspective of another connector of the present invention ready for engagement with the support rod.

FIG. 12 shows another embodiment of a connector of the present invention, generally designated 81. The connector comprises a connecting member 83 similar to that previously described, having generally parallel upper and lower portions 85,86 connected by a juncture 87, and a slot 88 for receiving the support rod 3. The connector 81 also includes a retainer 89 which, in this embodiment, is generally rectangular in shape, instead of U-shaped. The retainer 89 is sized to fit between the rod 3 and the juncture 87 to prevent movement of the rod out of the slot 88. The retainer 89 has two notches 91 along one edge which receive portions of the juncture 87 on opposite sides of the slot 88 when the retainer is in place. The reception of the juncture 87 in these notches 91 helps hold the retainer 89 in place in the connecting member 83. A pair of cut-outs 93 in the juncture 87 reduce the overall width of the juncture to allow for reception of the juncture in the retainer notches 91 without increasing the overall length of the retainer 89. In all other respects, the connector 81 functions similarly to the previous embodiment.

Figure 13:
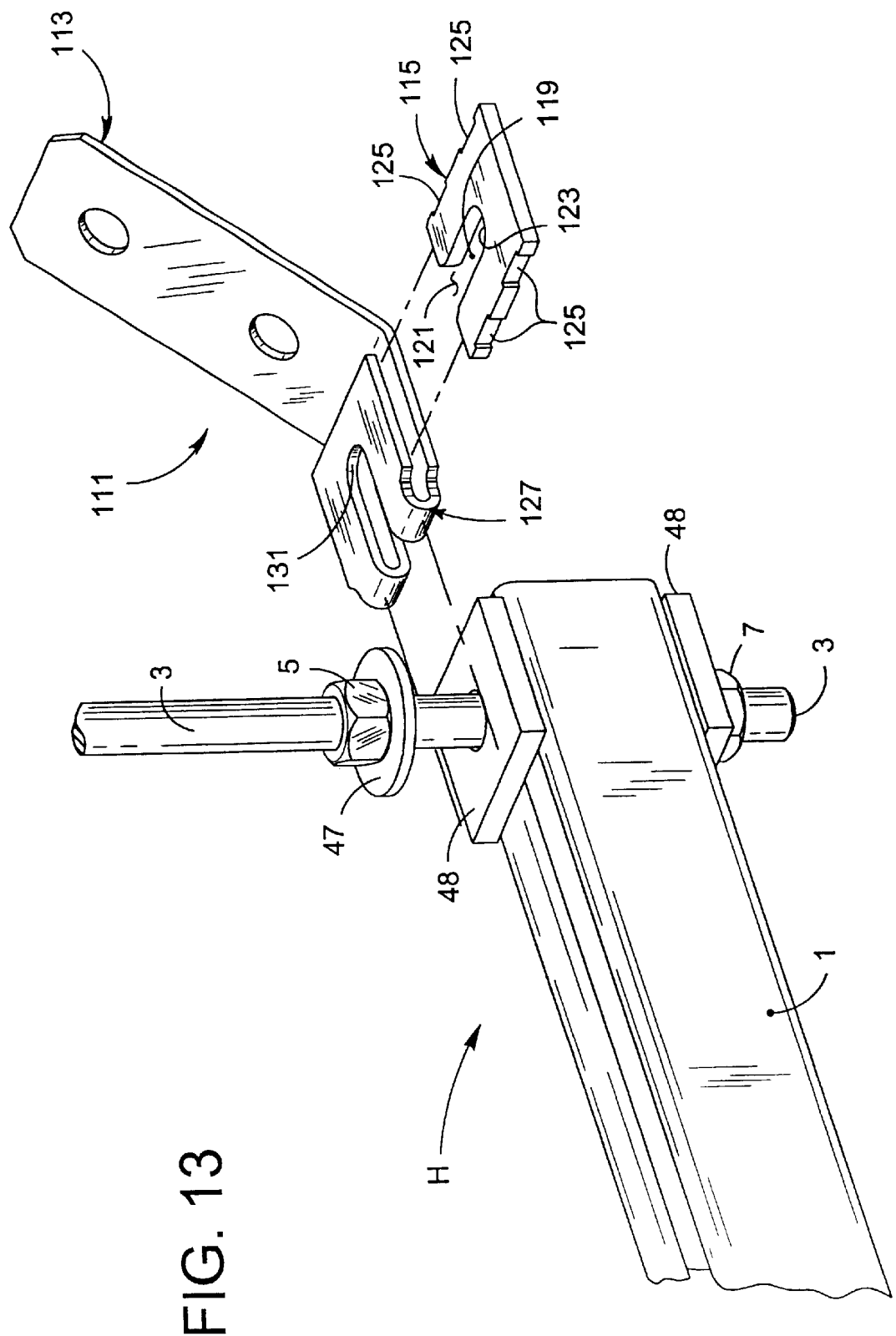
FIG. 13 is a perspective of yet another connector of the present invention ready for engagement with the support rod.

FIG. 13 illustrates yet another embodiment of a connector of the present invention, generally designated 111. The connector comprises a metal connecting member 113 identical to the connecting member of FIG. 12. The retainer 115, however, combines features of the two previous embodiments, being generally U-shaped and having a slot 119 with an open end 121 for entry of the support rod 3 into the slot and a closed end 123 engageable with the rod for limiting retainer movement. Like the previous embodiment, the retainer 115 has notches 125, with the notches in this embodiment being on opposite lateral edges, so that the retainer may be turned over or inserted from either side of the metal connecting member 113. Whatever the orientation or insertion direction of the retainer 115, the notches 125 will receive portions of the juncture 127 of the connector 111 located on opposite sides of the slot 131 to assist in maintaining the retainer in the connecting member 113.

It will be understood that connecting members and retainers of other shapes are contemplated as within the scope of the present invention.

It will be observed from the foregoing that the connector of the present invention is useful not only for installing bracing in new installations, but also for retrofitting existing tray systems with appropriate bracing, since the connector allows the bracing to be installed without removing the existing supports (e.g., rods). Further, the connector is easy to use and especially strong, noting that the double thickness provided by the upper and lower portions of the connecting member adds strength, and that the rod is securely held in the slot in the connecting member by the retainer which cannot fail unless the forces are so great as to cause the retainer to fail in shear across its entire width. Further, the design of the present invention allows the bracing to remain attached to the system even if a fastener holding the support in place becomes loose, as during seismic activity. For example, even if one or more of the nuts on a support rod loosens, the upper portion of the connecting member cannot unbend (straighten) due to the engagement of the closed end of the slot in the connecting member with the support rod.

In view of the above, it will be seen that the several objects of the invention are achieved and other advantageous results attained.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above without departing from the scope of the invention, it is intended that all matter contained in the above description and shown in the accompanying drawings shall be interpreted as illustrative and not in a limiting sense.

What is claimed is:

1. A connector for connecting a seismic brace to a support rod to inhibit movement of the rod during seismic activity, said connector comprising:

a metal connecting member having opposite sides and opposite ends, a lower portion, an upper portion overlying at least part of said lower portion and spaced therefrom to form a gap between said upper and lower portions, the upper and lower portions being joined at a juncture at one end of the member, openings in the juncture and in said upper and lower portions of the connecting member defining a slot extending from the juncture toward an opposite end of the connecting member, said slot having an open end at the juncture for entry of said support rod into the slot and a closed opposite end, and a retainer adapted for insertion in the gap between said upper and lower portions of the connecting member to a rod-retaining position in which it bridges the slot and in which it is disposed between the juncture and the support rod when the rod is in the slot whereby the support rod is retained in the slot by the retainer, the retainer being adapted to engage the juncture on opposite sides of the slot during seismic activity to prevent the rod from moving out of the slot.

2. A connector as set forth in claim 1 wherein said upper portion of the connecting member terminates in an edge opposite said juncture, and wherein said slot in the connecting member terminates short of said edge.

3. A connector as set forth in claim 1 wherein said connecting member is a one-piece member of sheet metal bent to form said upper and lower portions.

4. A connector as set forth in claim 3 wherein said connecting member comprises a blank bent to have a generally J-shape.

5. A connector as set forth in claim 1 wherein said retainer comprises a metal member having a slot extending into the member from one edge thereof, said retainer slot having an open end for entry of said support rod into the slot and a closed end, said retainer slot extending generally at right angles to the slot in the connecting member when the retainer is in its said rod-retaining position.

6. A connector as set forth in claim 5 wherein said retainer is formed to have a friction fit in said gap.

7. A connector for connecting a seismic brace to a support rod to inhibit movement of the rod during seismic activity, said connector comprising:

a metal connecting member having opposite sides and opposite ends, a lower portion, an upper portion overlying at least part of said lower portion and spaced therefrom to form a gap between said upper and lower portions, the upper and lower portions being joined at a juncture at one end of the member, openings in the juncture and in said upper and lower portions of the connecting member defining a slot extending from the juncture toward an opposite end of the connecting member, said slot having an open end at the juncture for entry of said support rod into the slot and a closed opposite end, said connecting member being a one-piece member of sheet metal bent to form said upper and lower portions, and a retainer adapted for insertion in the gap between said upper and lower portions of the connecting member to a rod-retaining position in which it bridges the slot and in which it is disposed between the juncture and the support rod when the rod is in the slot whereby the support rod is retained in the slot by the retainer, the retainer being adapted to engage the juncture on opposite sides of the slot during seismic activity to prevent the rod from moving out of the slot, said retainer comprising a metal member having a slot extending into the member from one edge thereof, said retainer slot having an open end for entry of said support rod into the slot and a closed end, said retainer slot extending generally at right angles to the slot in the connecting member when the retainer is in its said rod-retaining position.

8. A seismic brace system for bracing a support rod to inhibit movement of the rod during seismic activity, said system comprising:

a metal connecting member having opposite sides and opposite ends, a lower portion, an upper portion overlying at least part of said lower portion and spaced therefrom to form a gap between said upper and lower portions, the upper and lower portions being joined at a juncture at one end of the member, openings in the juncture and in said upper and lower portions of the connecting member defining a slot extending from the juncture toward an opposite end of the connecting member, said slot having an open end at the juncture for entry of said support rod into the slot and a closed opposite end;

a retainer adapted for insertion in the gap between said upper and lower portions of the connecting member to a rod-retaining position in which it bridges the slot and in which it is disposed between the juncture and the support rod when the rod is in the slot whereby the support rod is retained in the slot by the retainer, the retainer being adapted to engage the juncture on opposite sides of the slot during seismic activity to prevent the rod from moving out of the slot; and a seismic brace having two ends, one attachable to a support such as a ceiling or truss system and the other attachable to the metal connecting member for bracing said support rod.

9. A system as set forth in claim 8 wherein said upper portion of the connecting member terminates in an edge opposite said juncture, and wherein said slot in the connecting member terminates short of said edge.

10. A system as set forth in claim 8 wherein said connecting member is a one-piece member of sheet metal bent to form said upper and lower portions.

11. A system as set forth in claim 10 wherein said connecting member comprises a blank bent to have a generally J-shape.

12. A system as set forth in claim 8 wherein said retainer comprises a metal member having a slot extending into the member from one edge thereof, said retainer slot having an open end for entry of said support rod into the slot and a closed end, said retainer slot extending generally at right angles to the slot in the connecting member when the retainer is in its said rod-retaining position.

13. A system as set forth in claim 12 wherein said retainer is formed to have a friction fit in said gap.

* * * * *